US009471671B1

(12) United States Patent
Juang et al.

(10) Patent No.: US 9,471,671 B1
(45) Date of Patent: Oct. 18, 2016

(54) IDENTIFYING AND/OR RECOMMENDING RELEVANT MEDIA CONTENT

(71) Applicant: Google Inc., Mountain View, CA (US)

(72) Inventors: Philo Juang, El Paso, TX (US);
Shirley Connie Gaw, Paris (FR);
Pepijn Crouzen, Saarbruecken (DE);
Tim Dasilva, North Hills, CA (US);
Benoit de Boursetty, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 14/132,628

(22) Filed: Dec. 18, 2013

(51) Int. Cl.
*G06F 17/30* (2006.01)

(52) U.S. Cl.
CPC ..... *G06F 17/30707* (2013.01); *G06F 17/3002* (2013.01); *G06F 17/30029* (2013.01)

(58) Field of Classification Search
CPC ............ G06F 17/30707; G06F 17/3002; G06F 17/30029; G06Q 30/0269
USPC ............................................. 707/738
See application file for complete search history.

(56) References Cited

U.S. PATENT DOCUMENTS

| | | | | |
|---|---|---|---|---|
| 6,167,448 A * | 12/2000 | Hemphill | ............... | G06F 9/542 709/217 |
| 6,351,556 B1 * | 2/2002 | Loui | ................... | G06K 9/4647 382/164 |
| 6,574,583 B1 * | 6/2003 | Brossette | .............. | G06Q 10/04 702/179 |
| 6,983,139 B2 * | 1/2006 | Dowling | ............. | H04L 12/1859 455/414.1 |
| 7,289,793 B2 * | 10/2007 | Norwood | ............. | H04L 12/189 455/3.01 |
| 7,394,816 B1 * | 7/2008 | Bill | .................... | G06Q 30/0251 370/355 |
| 7,539,673 B2 * | 5/2009 | Trowbridge | ........ | G06F 11/3438 |
| 7,966,395 B1 * | 6/2011 | Pope | ................. | G06F 17/30867 709/224 |
| 7,975,015 B2 * | 7/2011 | Horvitz | ................ | G06Q 10/107 709/203 |
| 8,255,948 B1 * | 8/2012 | Black | ............. | H04N 21/234336 709/219 |
| 8,386,601 B1 * | 2/2013 | Sutter | ...................... | H04N 7/10 705/14.51 |
| 8,438,280 B1 * | 5/2013 | Sutter | ................ | H04N 21/2402 705/14.51 |
| 8,463,790 B1 * | 6/2013 | Joshi | ........................ | G06F 7/00 707/738 |
| 8,566,866 B1 * | 10/2013 | Fleischman | ...... | H04N 21/23424 707/769 |
| 8,615,442 B1 * | 12/2013 | Kapur | ................ | G06Q 30/0269 705/26.1 |
| 8,738,906 B1 * | 5/2014 | Sampath | .............. | H04N 21/643 713/166 |
| 8,751,492 B1 * | 6/2014 | Catane | ................... | G06Q 30/02 705/14.53 |
| 8,799,061 B1 * | 8/2014 | Chatterjee | .......... | G06Q 30/0261 705/14.1 |
| 9,015,744 B1 * | 4/2015 | Siegel | ................ | H04N 21/4784 709/203 |
| 9,031,952 B2 * | 5/2015 | Tian | .................. | G06F 17/30616 707/737 |
| 9,058,332 B1 * | 6/2015 | Darby | ................ | G06F 17/3005 |

(Continued)

OTHER PUBLICATIONS

Karapantelakis et al., "Utilizing Social Context for Providing Personalized Services to Mobile Users", EuroSSC 2010, LNCS 6446, pp. 28-41, 2010.*

(Continued)

*Primary Examiner* — Phuong Thao Cao
(74) *Attorney, Agent, or Firm* — Byrne Poh LLP

(57) ABSTRACT

A system for identifying and/or recommending relevant media content is provided. The system includes a relevancy component, a classification component and a notification component. The relevancy component determines a topic or an event related to media content and associates the media content with a group of media content based on the topic or the event. The classification component assigns a classifier value to the media content based on data associated with the media content and the group of media content. The notification component generates a notification message associated with the media content for a user based on the classifier value and a temporal-based relevancy value generated as a function of user context.

16 Claims, 12 Drawing Sheets

(56) References Cited

U.S. PATENT DOCUMENTS

| | | | |
|---|---|---|---|
| 9,106,710 B1* | 8/2015 | Feimster | H04L 67/22 |
| 9,131,339 B1* | 9/2015 | Kulfan | H04W 4/02 |
| 9,179,256 B1* | 11/2015 | Pietraniec | H04W 4/021 |
| 2003/0006913 A1* | 1/2003 | Joyce | G06Q 20/3224 340/994 |
| 2003/0008661 A1* | 1/2003 | Joyce | H04W 4/02 455/456.1 |
| 2003/0028884 A1* | 2/2003 | Swart | H04N 7/17318 725/51 |
| 2003/0197731 A1* | 10/2003 | Chiu | G06F 3/0482 715/764 |
| 2004/0133342 A1* | 7/2004 | Banker | G06F 17/3089 701/532 |
| 2004/0137917 A1* | 7/2004 | Ohto | H04W 40/20 455/456.1 |
| 2005/0246740 A1* | 11/2005 | Teraci | H04H 60/47 725/45 |
| 2006/0020596 A1* | 1/2006 | Liu | G06F 17/30867 |
| 2006/0031288 A1* | 2/2006 | Ter Horst | G06F 17/30867 709/204 |
| 2006/0036728 A1* | 2/2006 | Xie | H04L 12/24 709/224 |
| 2006/0293065 A1* | 12/2006 | Chew | G06Q 30/02 455/456.3 |
| 2008/0077574 A1* | 3/2008 | Gross | G06F 17/30699 |
| 2008/0140716 A1* | 6/2008 | Saito | G06Q 99/00 |
| 2008/0154696 A1* | 6/2008 | Spiegelman | G06F 17/30867 705/7.32 |
| 2008/0275867 A1* | 11/2008 | Hollemans | G06F 17/30994 |
| 2008/0294617 A1* | 11/2008 | Chakrabarti | G06F 17/30867 |
| 2009/0077160 A1* | 3/2009 | Svendsen | G06F 17/30029 709/203 |
| 2009/0138457 A1* | 5/2009 | Askey | G06F 17/30053 |
| 2009/0138505 A1* | 5/2009 | Purdy | G06F 17/30743 |
| 2009/0177523 A1* | 7/2009 | Routtenberg | G06F 17/30241 705/7.34 |
| 2009/0234831 A1* | 9/2009 | Ebadollahi | G06F 17/30038 |
| 2009/0320059 A1* | 12/2009 | Bolyukh | H04H 20/106 725/32 |
| 2010/0082398 A1* | 4/2010 | Davis | G06Q 30/02 705/14.54 |
| 2010/0124892 A1* | 5/2010 | Issa | H04H 20/82 455/179.1 |
| 2010/0235367 A1* | 9/2010 | Chitiveli | G06F 17/30707 707/752 |
| 2010/0262599 A1* | 10/2010 | Nitz | G06F 17/3087 707/723 |
| 2010/0325205 A1* | 12/2010 | Murphy | G06Q 10/10 709/204 |
| 2011/0040752 A1* | 2/2011 | Svore | G06F 17/30864 707/728 |
| 2011/0295689 A1* | 12/2011 | Brady | G06Q 30/0241 705/14.54 |
| 2012/0016873 A1* | 1/2012 | Mathieson | G06F 17/3053 707/727 |
| 2012/0030282 A1* | 2/2012 | Brody | G06Q 50/01 709/203 |
| 2012/0064917 A1* | 3/2012 | Jenkins | G06F 17/3087 455/456.1 |
| 2012/0095979 A1* | 4/2012 | Aftab | G06F 17/30867 707/706 |
| 2012/0151391 A1* | 6/2012 | Bhatia | G06F 17/30864 715/764 |
| 2012/0158638 A1* | 6/2012 | Churchill | G06Q 10/00 706/52 |
| 2012/0158851 A1* | 6/2012 | Kelmenson | G06F 17/30864 709/205 |
| 2012/0166530 A1* | 6/2012 | Tseng | G06Q 30/0255 709/204 |
| 2012/0191715 A1* | 7/2012 | Ruffner | G06F 17/30011 707/738 |
| 2012/0215903 A1* | 8/2012 | Fleischman | G06Q 30/0201 709/224 |
| 2012/0221557 A1* | 8/2012 | Edmonds | G06F 17/30864 707/723 |
| 2012/0272160 A1* | 10/2012 | Spivack | G06Q 10/10 715/752 |
| 2012/0284290 A1* | 11/2012 | Keebler | G06F 17/3089 707/756 |
| 2012/0317198 A1* | 12/2012 | Patton | G06Q 10/10 709/204 |
| 2013/0013595 A1* | 1/2013 | Tseng | G06F 17/30867 707/723 |
| 2013/0018896 A1* | 1/2013 | Fleischman | G06Q 50/01 707/748 |
| 2013/0117365 A1* | 5/2013 | Padmanabhan | H04W 4/206 709/204 |
| 2013/0117692 A1* | 5/2013 | Padmanabhan | H04N 21/4126 715/753 |
| 2013/0238762 A1* | 9/2013 | Raleigh | H04L 67/306 709/219 |
| 2013/0246323 A1* | 9/2013 | Athas | G06N 5/02 706/46 |
| 2013/0325869 A1* | 12/2013 | Reiley | G06F 17/3002 707/741 |
| 2014/0040162 A1* | 2/2014 | McConnell | G06F 17/30312 705/347 |
| 2014/0081977 A1* | 3/2014 | Kapur | G06Q 30/0269 707/738 |
| 2014/0089780 A1* | 3/2014 | Garcia-Martinez | G06F 17/00 715/234 |
| 2014/0204423 A1* | 7/2014 | Koutrika | G06F 3/1203 358/1.16 |
| 2014/0244621 A1* | 8/2014 | Lindsay | G06F 17/30699 707/722 |
| 2014/0279261 A1* | 9/2014 | Krishna Kolluri | G06Q 30/0627 705/26.63 |
| 2014/0280052 A1* | 9/2014 | Alonso | G06Q 30/0201 707/722 |
| 2014/0282721 A1* | 9/2014 | Kuncl | G06Q 10/10 725/35 |
| 2014/0337346 A1* | 11/2014 | Barthel | G06F 17/30899 707/738 |
| 2014/0344861 A1* | 11/2014 | Berner | H04N 21/4826 725/46 |
| 2014/0372372 A1* | 12/2014 | Schlomka | G06F 17/30029 707/609 |
| 2014/0372429 A1* | 12/2014 | Ziklik | G06F 17/30867 707/736 |
| 2015/0019523 A1* | 1/2015 | Lior | G06Q 10/109 707/708 |
| 2015/0039608 A1* | 2/2015 | Basilico | G06F 17/3053 707/734 |
| 2015/0067505 A1* | 3/2015 | Metcalf | G06F 17/3089 715/716 |
| 2015/0142753 A1* | 5/2015 | Soon-Shiong | G06F 17/3002 707/673 |
| 2015/0169744 A1* | 6/2015 | Walkingshaw | G06F 17/3097 707/738 |

OTHER PUBLICATIONS

Hinze et al., "Location- and Time-Based Information Delivery in Tourism", T. Hadzilacos et al. (Eds): SSTD 2003, LNCS 2750, pp. 489-507, 2003.*

Luo et al., "An Efficient Protocol for RFID Multigroup Threshold-Based Classification", 2013 Proceedings IEEE Infocom, pp. 890-898, 2013.*

Thawani et al., "Context-Aware Timely Information Delivery in Mobile Environments", The Computer Journal, vol. 50, No. 4, pp. 460-472, 2007.*

* cited by examiner

IDENTIFYING AND/OR RECOMMENDING RELEVANT MEDIA CONTENT

TECHNICAL FIELD

This disclosure relates to system(s) and method(s) for identifying and/or recommending relevant media content.

BACKGROUND

The internet and media enabled portable computing devices have dramatically altered the processes for generating and consuming media content. Additionally, the convenience of being able to upload, consume and/or share media content via the internet, essentially on demand, has resulted in explosive growth of internet media consumption. Presently, users can generate media content using numerous types of devices, e.g., computers, cellular phones, cameras, portable computing devices, etc. Furthermore, users can upload media content from virtually anywhere at any time, as long as they have access to media capable device(s) with an internet connection. For example, millions (if not billions) of people around the world have capability to produce media content, and popular online media services (e.g., service providers) can receive many hours of newly uploaded user-generated content every minute. Conventional online media services (e.g., conventional service providers) can allow users to upload and/or share media content so that other users can consume the media content. Furthermore, conventional online media services (e.g., conventional service providers) can recommend media content to users. However, relevancy of media content that is recommended to users can be improved.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a relevancy component, a classification component and a notification component. The relevancy component determines a topic or an event related to media content and associates the media content with a group of media content based on the topic or the event. The classification component assigns a classifier value to the media content based on data associated with the media content and the group of media content. The notification component generates a notification message associated with the media content for a user based on the classifier value and a temporal-based relevancy value generated as a function of user context.

In accordance with another implementation, a method provides for determining a topic or an event related to media content, associating the media content with a group of media content based on the topic or the event, assigning a classifier value to the media content based on data associated with the media content and the group of media content, and generating a notification message associated with the media content for a user based on the classifier value and a temporal-based relevancy value generated as a function of user context.

In accordance with yet another implementation, a non-transitory computer readable storage medium comprising computer-executable instructions, that in response to execution, cause a computing system to perform operations, comprising: determining a topic or an event related to media content, associating the media content with a group of media content based on the topic or the event, assigning a classifier value to the media content based on data associated with the media content and the group of media content, and generating a notification message associated with the media content for a user based on the classifier value and a temporal-based relevancy value generated as a function of user context.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
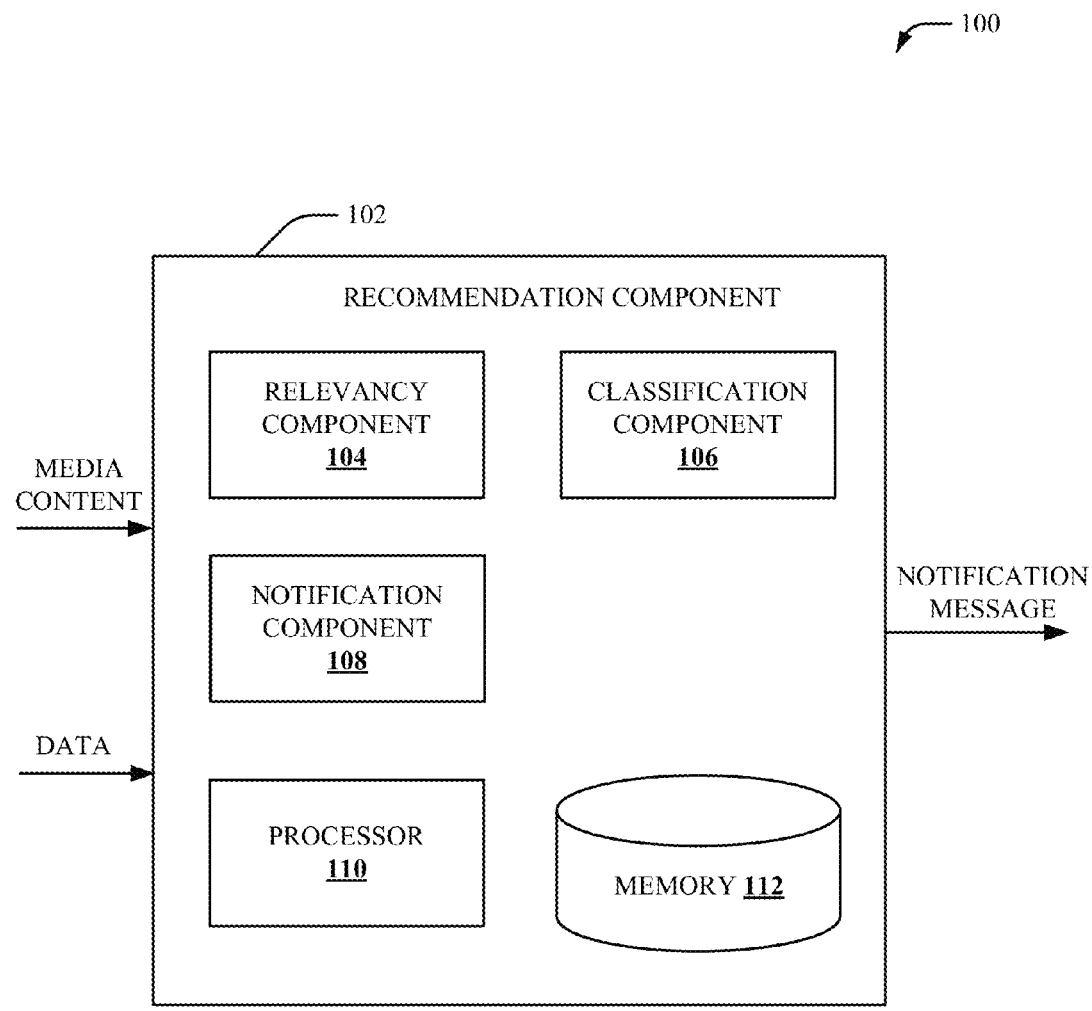
FIG. 1 illustrates a high-level block diagram of an example system for identifying and/or recommending relevant media content, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Many conventional service providers allow users to upload media content (e.g., audio content and/or video content) to a server (e.g., a media content server). The media content can then be delivered (e.g., streamed) to other users. Service providers can provide network infrastructure for users to upload media content to the server (e.g., the media content server) and/or for users to consume media content uploaded to the server (e.g., the media content server). Furthermore, conventional service providers can recommend media content to users. However, relevancy of media content that is recommended to users and/or techniques for recommending media content to users can be improved.

To that end, techniques for identifying and/or recommending relevant media content are disclosed. For example, real-time identification and/or recommendation of relevant media content (e.g., trending media content) based on context of a user can be provided. In one example, relevant media content for a user can be identified and/or recommended based on data that is associated with an interval of time and/or a location. In an aspect, media content can be classified based on data associated with the media content and/or a grouping of media content (e.g., media content can be classified based on determined relevancy and/or determined quality of the media content). For example, media content can be classified based on a grouping of media content (e.g., a total number of media content associated with a particular group of media content), rate of sharing of media content and/or consumption of media content (e.g., number of views associated with media content). In one example, media content can be classified based at least in part on one or more threshold values associated with a grouping of media content, rate of sharing of media content and/or consumption of media content. In another example, different classifier values can be associated with different threshold values. In another aspect, a notification vector (e.g., a notification message) can be generated, configured and/or sent based on the classification of media content (e.g., the data associated with the media content and/or the grouping of media content, the rate of sharing of media content, the consumption of media content, etc.) and a temporal-based relevancy value generated as a function of user context (e.g., temporal data and/or location data associated with user context). As such, relevancy (e.g., quality) of media content that is recommended to users and/or techniques for generating a notification vector (e.g., a notification message) associated with relevant media content can be improved.

Referring initially to FIG. 1, there is illustrated an example system 100 for identifying and/or recommending relevant media content, according to an aspect of the subject disclosure. In an aspect, the system 100 can be implemented on or in connection with one or more servers that host user-uploaded media content. For example, the system 100 can be employed by various systems, such as, but not limited to media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, and the like. In another aspect, the system 100 can be implemented in connection with a media capable device. For example, the system 100 can be implemented in connection with a cellular phone (e.g., a smartphone), a tablet, a personal computer (PC), a desktop computer, a laptop computer, a television (e.g., an interactive television, an internet-connected television, etc.), a personal digital assistant (PDA), an electronic reader (e-reader), a camera, a portable computing device, a set-top box, a streaming media device, a gaming device, another media capable device, etc.

Specifically, the system 100 can provide a recommendation component with a relevancy feature (e.g., relevancy component 104), a classification feature (e.g., classification component 106) and a notification feature (e.g., notification component 108) that can be utilized in, for example, a media content application. The relevancy feature determines a topic or an event related to media content and associates the media content with a group of media content based on the topic or the event. The classification feature assigns a classifier value to the media content based on a total number of media content associated with the group of media content. The notification feature generates a notification message associated with the media content for a user based on the classifier value and a temporal-based relevancy value generated as a function of user context.

In particular, the system 100 can include a recommendation component 102 that includes at least a relevancy component 104, a classification component 106 and a notification component 108. In an aspect, recommendation component 102 can be associated with a media provider (e.g., a media sharing provider). Aspects of the systems, apparatuses or processes explained in this disclosure can constitute machine-executable component(s) embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 112 for storing computer executable components and instructions. System 100 can further include a processor 110 to facilitate operation of the instructions (e.g., computer executable components and instructions) by system 100.

The recommendation component 102 (e.g., the relevancy component 104) can receive media content (e.g., MEDIA CONTENT shown in FIG. 1). Media content (e.g., a media file) can include but is not limited to a video (e.g., a video file, a video clip, a video sample, etc.), an image (e.g., an image file, a picture, a thumbnail, etc.), music (e.g., an audio file, an audio clip, an audio sample, etc.), an electronic book (e-book), a video game and/or user-generated content. It is to be appreciated that the media content can be in any recognizable and suitable media file format (e.g., video file format, image file format and/or audio file format), codec compression format, etc. In one example, the media content can be uploaded by a user (e.g., a user of a media sharing platform). For example, a user can upload the media content via a smart phone, a cell phone, a personal digital assistant (PDA), a tablet, a laptop, a desktop computer, a portable music player, a video game system, an electronic reader (e-reader), global positioning system (GPS), a set-top box, a television, etc.

The relevancy component 104 can determine a topic or an event (e.g., a content category) related to the media content. Additionally or alternatively, the relevancy component 104 can assign a topic or an event to the media content. As such, the relevancy component 104 can classify subject matter associated with the media content. In an example, a topic and/or an event can include at least one subject matter element that classifies the media content. A topic and/or an event can be a word or a set of words (e.g., phrase) that describes content included in and/or associated with the media content. As such, a topic and/or an event can be a category that classifies the media content. In an aspect, a topic can be non-temporal subject matter associated with and/or included in the media content. For example, a topic can include, but is not limited to, a subject, a theme, a person, an entity, a geographic location, a place, an entity, an object, a product, a good, etc. In a non-limiting example, a topic can include a category (e.g., a use case category), such as but not limited to, entertainment, news, social, travel, culture, hobby, lifestyle, learning, etc. In another aspect, an event can be temporal-based subject matter associated with and/or included in the media content. For example, an event can include, but is not limited to, a news event, an organized event, an entertainment event (e.g. a sporting event, a music event, a movie event, etc.), a social event, a travel event, etc. that is associated with an interval of time (e.g., a fixed beginning and ending).

In an aspect, the relevancy component 104 can determine a topic or an event based on one or more relevancy algorithms (e.g., a topic or an event associated with the media content can be algorithmically determined). In another aspect, the relevancy component 104 can determine a topic or an event based on content included in the media content, metadata (e.g., a title, a description, etc.) for the media content, one or more tags (e.g., comments, notes, ratings, reviews, etc.) for the media content, text from a website that includes the media content (e.g., an embedded media file), etc. In yet another aspect, the relevancy component 104 can determine a topic or an event based on identification data (e.g., one or more possible topics and/or one or more possible events) stored in a database (not shown).

Additionally, the relevancy component 104 can associate the media content with a group of media content (e.g., a group of related media content) based on the topic or the event. For example, the relevancy component 104 can associate the media content with a group of media content that is associated with the topic or the event (e.g., the topic or the event determined to be related to the media content). The group of media content can be associated with one or more media content elements (e.g., one or more media files). In an aspect, the group of media content can be a collection of media content to facilitate determination, configuration and/or generation of a notification message (e.g., a notification vector).

The classification component 106 can categorize the media content (e.g., assign a classifier value to the media content) based on data associated with the media content and/or a grouping of related media content (e.g., a group of media content associated with the media content). For example, the classification component 106 can categorize the media content (e.g., assign a classifier value to the media content) based on textual data and/or video data associated with the media content and/or a grouping of related media content. In one example, the classification component 106 can categorize the media content (e.g., assign a classifier value to the media content) based on a determined quality and/or a determined relevancy of the media content. In an aspect, the classification component 106 can assign a classifier value to the media content based on a total number of media content associated with the group of media content. For example, a type of classifier value can be determined as a function of a total number of media content associated with the group of media content. As such, a greater number of media content associated with a group can correspond to greater relevancy.

In one example, a first classifier value can be assigned to the media content based on a first threshold value related to the data associated with the media content and/or the grouping of related media content, a second classifier value can be assigned to the media content based on a second threshold value related to the data associated with the media content and/or the grouping of related media content, etc. For example, the classification component 106 can assign a first classifier value to the media content in response to a determination that a quality value (e.g., a relevancy value) associated with the media content and/or the grouping of related media content is above a first threshold value, assign a second classifier value to the media content in response to a determination that a quality value (e.g., a relevancy value) associated with the media content and/or the grouping of related media content is above a second threshold value, etc. In another example, a first classifier value can be assigned to the media content based on a first threshold value associated with total number of media content included in the group of media content, a second classifier value can be assigned to the media content based on a second threshold value associated with total number of media content included in the group of media content, etc. For example, the classification component 106 can assign a first classifier value to the media content in response to a determination that the total number of media content associated with the group of media content is above a first threshold value, assign a second classifier value to the media content in response to a determination that the total number of media content associated with the group of media content is above a second threshold value, etc. In an aspect, a threshold value associated with a classifier value can be generated as a function of a geographic location. For example, the classification component 106 can assign a first classifier value to the media content as a function of a first threshold value associated with a first geographic location and assign a second classifier value to the media content as a function of a second threshold value associated with a second geographic location. In another aspect, a threshold value associated with a classifier value can be generated as a function of a type of notification message and/or a type of user device.

In an aspect, a larger number of media content can correspond to a larger classifier value (e.g., greater relevancy). In another aspect, a larger number of media content can correspond to a classifier value with a greater weight (e.g., greater relevancy). In a non-limiting example, a classifier value can correspond to a classification such as, but not limited to, not relevant, somewhat relevant, relevant, highly relevant, etc. In another non-limiting example, a classifier value can correspond to a classification such as, but not limited to, not interesting, interesting, very interesting, etc. In yet another non-limiting example, a classifier value can correspond to a classification such as, but not limited to, not newsworthy, newsworthy, breaking news, etc.

Additionally or alternatively, the classification component 106 can categorize the media content (e.g., assign a classifier value to the media content) based on rate of sharing of the media content. For example, the classification component 106 can assign a classifier value to the media content based on distribution of the media content to one or more network data stores within a certain time interval (e.g., rate of distribution of the media content via a network within a certain time interval). In one example, a first classifier value can be assigned to the media content based on a first threshold value associated with rate of sharing of the media content, a second classifier value can be assigned to the media content based on a second threshold value associated with rate of sharing of the media content, etc. For example, the classification component 106 can assign a first classifier value to the media content in response to a determination that rate of sharing of the media content is above a first threshold value, assign a second classifier value to the media content in response to a determination that rate of sharing of the media content is above a second threshold value, etc.

Additionally or alternatively, the classification component 106 can categorize the media content (e.g., assign a classifier value to the media content) based on consumption of the media content. For example, the classification component 106 can categorize the media content (e.g., assign a classifier value to the media content) based on number of views (e.g., number of page views) associated with the media content. In one example, a first classifier value can be assigned to the media content based on a first threshold value associated with consumption of the media content, a second classifier value can be assigned to the media content based on a second threshold value associated with consumption of the media content, etc. For example, the classification component 106 can assign a first classifier value to the media content in response to a determination that consumption of the media content is above a first threshold value, assign a second classifier value to the media content in response to a determination that consumption of the media content is above a second threshold value, etc.

The notification component 108 can generate a notification message associated with the media content for the user based on the classifier value and a temporal-based relevancy value (e.g., a temporal-based user relevancy value). The temporal-based relevancy value can be generated and/or modified as a function of user context. Additionally or alternatively, the temporal-based relevancy value can be generated and/or modified as a function of context associated with the topic or the event (e.g., topic context or event context). The temporal-based relevancy value can be associated with a certain time interval (e.g., a bounded period of time). In an aspect, the certain time interval can be associated with the user. In another aspect, the certain time interval can be associated with a topic or an event. Additionally or alternatively, the notification component 108 can determine one or more users that can receive a notification message (e.g., the notification component 108 can determine one or more users to notify regarding the media content) based on the classifier value assigned to the media content.

User context can be determined based on data (e.g., DATA shown in FIG. 1) received by recommendation component 102. The data (e.g., user data) can be received by recommendation component 102 in the instance where a user consents to the use of such data for identifying relevant media content, recommending relevant media content and/or determining user context. For example, the data (e.g., user data) received by recommendation component 102 can be associated with a user that is associated with the notification message. In an aspect, user context can be determined based on temporal data associated with the user. For example, user context can be determined based on a calendar (e.g., an online calendar, an electronic calendar) associated with the user (e.g., a user account of the user). However, it is to be appreciated that user context can be determined based on other temporal data associated with the user.

In another aspect, user context can be determined based on a geographic location associated with the user. For example, a geographic location of the user can be determined based on a user account associated with the user. In another example, the geographic location of the user can be determined based on location data associated with a user device (e.g., a computing device) of the user. However, it is to be appreciated that a geographic location of the user can be determined based on other data associated with the user. In yet another aspect, user context can be determined based on content consumed by the user (e.g., media content consumed by the user and/or other content consumed by the user). For example, user context can be determined based on, but not limited to, viewing, searching, downloading, sharing (e.g., posting on a social networking site, blogging, linking to or embedding in a website, etc.), rating, and/or reviewing content (e.g., media content and/or other content). As such, user context can be determined based on user behavior. In yet another aspect, user context can be determined based on data associated with an account of the user.

Additionally or alternatively, topic context and/or event context can be determined based on data (e.g., DATA shown in FIG. 1) received by recommendation component 102. For example, topic context and/or event context can be determined based on temporal data associated with the topic and/or the event. In one example, a start time and/or date can be determined for the topic or the event. Additionally or alternatively, an end time and/or date can be determined for the topic or the event. However, it is to be appreciated that topic context and/or event context can be determined based on other temporal data associated with the topic and/or the event. In an aspect, the temporal-based relevancy value can be modified (e.g., increased, decreased, upgraded, downgraded, etc.) in response to an event or a trigger (e.g., an alteration associated with a topic or an event associated with the media content). In another aspect, the classification component 106 can assign a new classifier value to the media content based on the temporal-based relevancy value. For example, a lower classification value (e.g., a downgraded classification value) can be assigned to the media content based on the temporal-based relevancy value. In another example, a greater classification value (e.g., an upgraded classification value) can be assigned to the media content based on the temporal-based relevancy value.

As such, a type of notification message can be generated based on the classifier value and the temporal-based relevancy value (e.g., the temporal-based user relevancy value) generated as a function of user context, topic context and/or event context. In an aspect, a notification message can be a notification (e.g., a push notification) for a user device. For example a user device (e.g., a user computing device) can include, but not limited to, a mobile device, a cellular phone (e.g., a smartphone), a tablet, a personal computer (PC), a desktop computer, a laptop computer, a personal digital assistant (PDA), an electronic reader (e-reader), a camera, a media capable device, a portable computing device, an interactive television, an internet-connected television, a set-top box, a streaming media device, a gaming device, another computing device, etc. In another aspect, a notification message can be an email notification. In yet another aspect, a notification message can be presented via a webpage or an application associated with a media sharing service. In yet another aspect, a notification message can be a notification message associated with an operating system of a user device. In an aspect, the notification component 108 can generate a notification message associated with the media content based on a user profile of a user. For example, the notification component 108 can generate a notification message associated with the media content based on one or more preferences (e.g., one or more settings) associated with a user profile of a user, one or more interests of a user associated with a user profile, etc.

While FIG. 1 depicts separate components in system 100, it is to be appreciated that the components may be implemented in a common component. For example, the relevancy component 104, the classification component 106 and/or the notification component 108 can be included in a single component. Further, it can be appreciated that the design of system 100 can include other component selections, component placements, etc., to facilitate identifying and/or recommending relevant media content.

Figure 2:
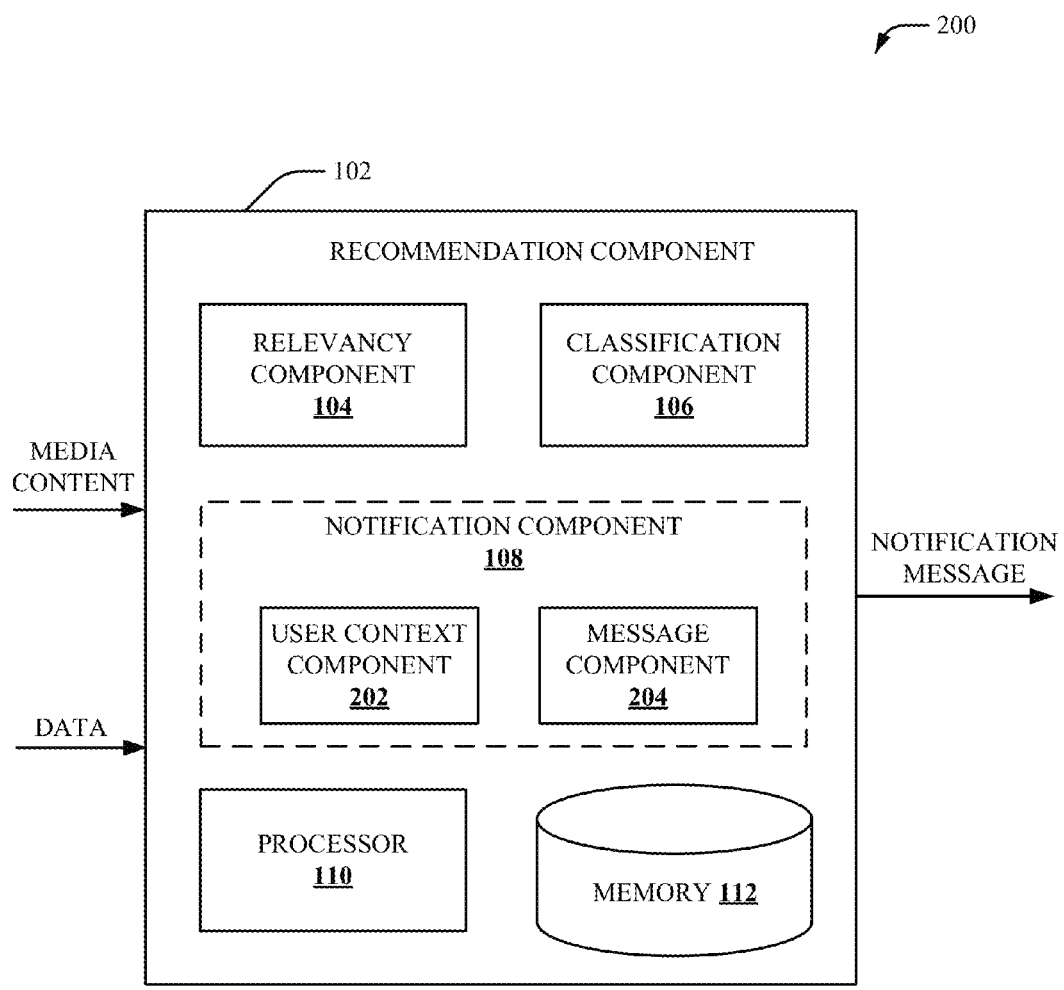
FIG. 2 illustrates a high-level block diagram of another example system for identifying and/or recommending relevant media content, in accordance with various aspects and implementations described herein.

FIG. 2 illustrates a non-limiting implementation of a system 200 in accordance with various aspects and implementations of this disclosure. The system 200 includes recommendation component 102. The recommendation component 102 can include the relevancy component 104, the classification component 106 and/or the notification component 108. The notification component 108 can include a user context component 202 and/or a message component 204.

A temporal-based relevancy value can be generated and/or modified as a function of context data generated and/or determined by the user context component 202. The user context component 202 can determine user context based on data (e.g., user data) received by recommendation component 102. The data (e.g., user data) can be received by recommendation component 102 in the instance where a user consents to the use of such data for identifying relevant media content, recommending relevant media content and/or determining user context. In an aspect, user context can be determined based on temporal data and/or location data associated with the user. For example, a subset of data associated with a user can be relevant for a certain period of time (e.g., a subset of data associated with a user can be associated with a start time and an end time). However, after the certain period of time, the subset of data associated with the user can become irrelevant. Additionally or alternatively, user context can be determined based on a geographic location associated with the user. For example, a geographic location can be determined based on a computing device associated with the user (e.g., global positioning system coordinates associated with a computing device of a user) and/or a user account associated with the user (e.g., information associated with a user account of a user).

In another aspect, user context can be determined based on content consumed by the user. For example, the user context component 202 can determine type of content that a user may be interested in based on content consumed by the user. Content consumed by the user can include, but is not limited to, content that is viewed, searched, downloaded, shared, rated, and/or reviewed by the user. In yet another aspect, user context can be determined based on data associated with an account of the user. For example, an account of the user can include information such as, but not limited to, interests of the user, favorites of the user, preferences of a user, information associated with the user, etc.

In yet another aspect, the user context component 202 can determine other contextual information. For example, the user context component 202 can determine context based on data (e.g., topic data and/or event data) received by recommendation component 102. In one example example, the user context component 202 can determine context based on temporal data associated with the topic or the event. For example, a topic or an event can be relevant for a certain period of time (e.g., a topic or an event can be associated with a start time and an end time). However, after the certain period of time, the topic or the event can become irrelevant. As such, a temporal-based relevancy value can be generated and/or modified as a function of user context, topic context and/or event context.

The message component 204 can generate and/or configure one or more notification messages associated with the media content (e.g., relevant media content) based on the classifier value and a temporal-based relevancy value (e.g., a temporal-based user relevancy value) generated as a function of data associated with the user context component 202. The message component 204 can determine a type of notification message to generate for a user based on the classifier value and the temporal-based relevancy value (e.g., the temporal-based user relevancy value) generated as a function of user context, topic context and/or event context. In an aspect, a notification message can be a notification (e.g., a push notification) for a user device. For example, user device can include a mobile device, a cellular phone (e.g., a smartphone), a tablet, a personal computer (PC), a desktop computer, a laptop computer, a personal digital assistant (PDA), an electronic reader (e-reader), a camera, a media capable device, a portable computing device, an interactive television, an internet-connected television, a set-top box, a streaming media device, a gaming device, another computing device, etc. In another aspect, a notification message can be an email notification. In yet another aspect, a notification message can be a notification that is displayed when utilizing (e.g., entering) a webpage or an application associated with a media sharing service and/or a social networking service. In yet another aspect, a notification message can be a notification message associated with an operating system of a user device. However, it is to be appreciated that a notification message can be a different type of notification.

As such, a user can receive different notification messages for different types of media content at different times and/or at different locations. For example, the message component 204 can generate an email notification message for a user if media content is associated with an internet meme. In another example, the message component 204 can generate push notification message to a user device of a user if media content is associated with a major event (e.g., a breaking news event) that occurs in a hometown or a nearby city associated with the user. In yet another example, the notification message 204 can generate a notification message that is displayed on a website or an application associated with a user account of a user if media content is associated with a major event (e.g., a breaking news event) that does not occur in a hometown or a nearby city associated with the user.

In one example, the message component 204 can generate and/or configure a notification message for media content associated with entertainment as a function of a classifier value (e.g., a classifier value associated with entertainment) and a temporal-based relevancy value generated as a function of contextual data. In a non-limiting example, message component 204 can generate, configure and/or send a notification message for new media content that is uploaded to a media sharing service (e.g., a new video that is uploaded to a media sharing service, a new episode associated with a media sharing service, etc.) based on temporal data and/or location data associated with a user. For example, the message component 204 can send a notification message (e.g., a notification message associated with new media content) to a user at a certain time associated with a geographic location of the user (e.g., 6 pm for a location associated with the user, evening for a location associated with the user, etc.). In another non-liming example, the message component 204 can generate a notification message (e.g., a notification message for a user) associated with media content (e.g., a video uploaded to a media sharing service) as a function of a threshold level (e.g., the media content is associated with a certain number of views, the media content is associated with a certain number of other media content, the media content is associated with a certain sharing rate, etc.), a geographic location (e.g., a country, a city, a region, etc.) associated with the user, a user profile associated with the user (e.g., interests of a user determined based on a user profile of the user) and/or temporal data associated with the user (e.g., the user is on a lunch break, etc.). In yet another non-liming example, the message component 204 can generate a notification message associated with a media content associated with an entertainment event (e.g., a sporting event, a music event, a movie event, a video game event, etc.) based at least in part on temporal data associated with the entertainment event (e.g., an interval of time associated with the sporting event, the music event, the movie event, a video game event, etc.).

In another example, the message component 204 can generate a notification message for media content associated with news as a function of a classifier value (e.g., a classifier value associated with news) and a temporal-based relevancy value generated as a function of contextual data. In a non-limiting example, the message component 204 can generate a notification message for media content associated with breaking news and/or local news as a function of temporal data and/or location data associated with a user (e.g., the message component 204 can send a notification message to a user at a certain time before the user goes to work or at certain time after the user leaves work).

In yet another example, the message component 204 can generate a notification message for media content associated with travel as a function of a classifier value (e.g., a classifier value associated with travel) and a temporal-based relevancy value generated as a function of contextual data. In a non-limiting example, the message component 204 can generate a notification message for media content associated with travel as a function of temporal data associated with a user. For example, the user context component 202 can determine that a user is travelling to a particular destination in two days. As such, the message component 204 can send one or more notification messages for media content that is associated with the particular destination within the next two days. Furthermore, user context component 202 can determine that the user has also been consuming particular media content associated with the particular destination (e.g., media content associated with a plurality of other media content related to the particular destination). As such, the message component 204 can additionally or alternatively send or more notification messages for other media content that is associated with the consumed media content with the next two days. In another non-limiting example, the message component 204 can generate a notification message for media content associated with travel as a function of location data associated with a user. For example, the user context component 202 can determine a location of the user (e.g., a location of a user device associated with the user). As such, the message component 204 can send or more notification messages for media content that is associated with the location of the user.

In yet another example, the message component 204 can generate a notification message for media content associated with lifestyle as a function of a classifier value (e.g., a classifier value associated with lifestyle) and a temporal-based relevancy value generated as a function of contextual data. In a non-limiting example, the message component 204 can generate a notification message for media content associated with lifestyle as a function of data that is associated with a user profile and temporal context data. For example, on a certain day and/or time (e.g., Saturday afternoon), the message component 204 can generate a notification message for media content that is associated with a hobby (e.g., cooking, sports, etc.) that a user is interested in (e.g., determined based on a user profile of the user). However, it is to be appreciated that the message component 204 can generate a notification message for other types of media content as a function of another type of classifier value and/or another type of temporal-based relevancy value generate as a function of contextual data (e.g., user context, topic context, event context, etc.).

Figure 3:
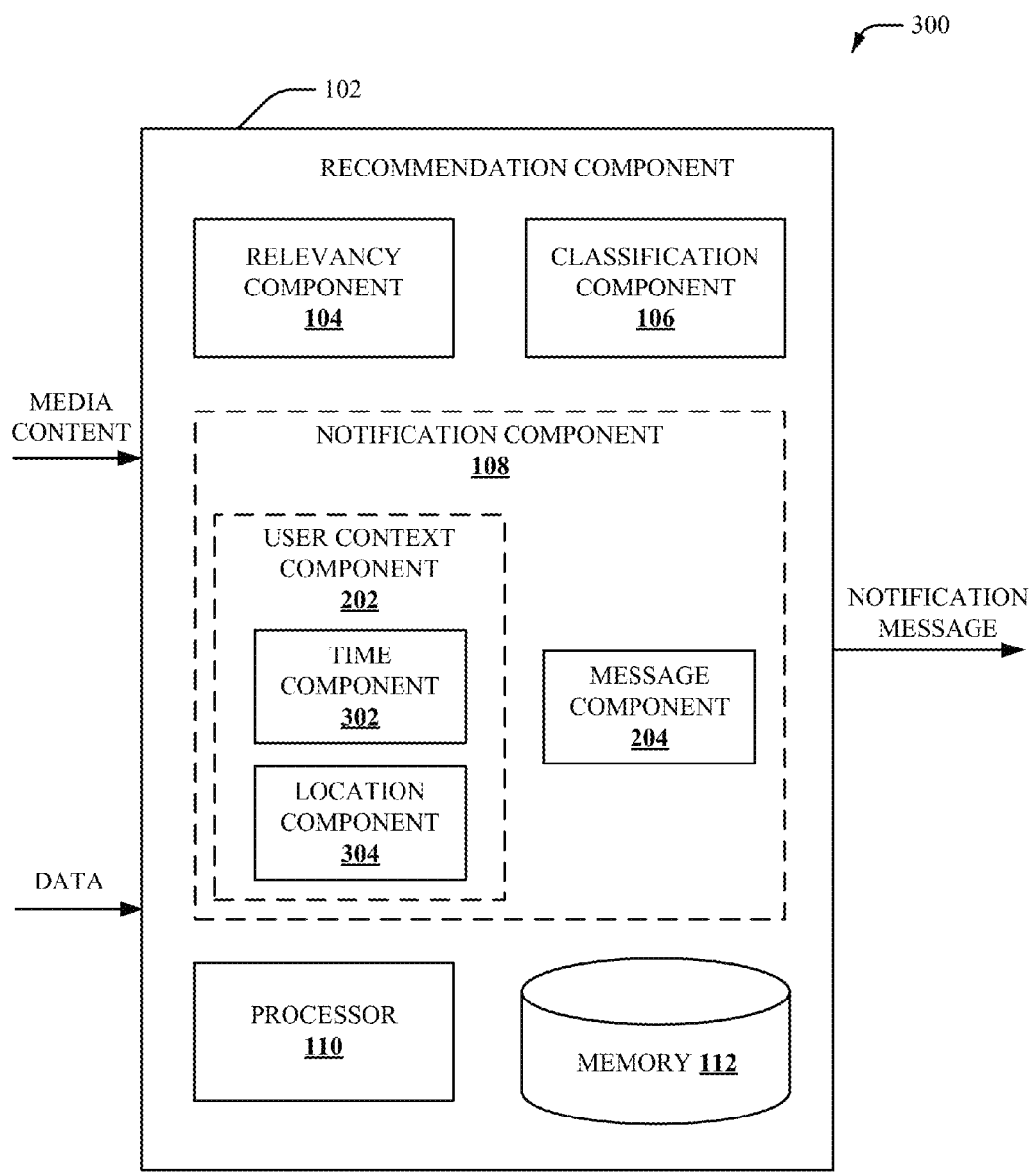
FIG. 3 illustrates a high-level block diagram of yet another example system for identifying and/or recommending relevant media content, in accordance with various aspects and implementations described herein.

FIG. 3 illustrates a non-limiting implementation of a system 300 in accordance with various aspects and implementations of this disclosure. The system 300 includes recommendation component 102. The recommendation component 102 can include the relevancy component 104, the classification component 106 and/or the notification component 108. The notification component 108 can include the user context component 202 and/or the message component 204. The user context component 202 can include and/or be associated with a time component 302 and/or a location component 304.

The time component 302 and/or the location component 304 can facilitate recommending highly relevant media content to a user based on time and/or location. The time component 302 can determine user context and/or generate user context information based on time (e.g., temporal data). In an aspect, the time component 302 can determine temporal information associated with the user based on data (e.g., user data) received by recommendation component 102. In another aspect, the time component 302 can determine temporal information associated with the user based on a user account of the user. In yet another aspect, the time component 302 can determine temporal information associated with the user based on a calendar (e.g., an online calendar, an electronic schedule, etc.) associated with the user.

Additionally or alternatively, the time component 302 can determine other context information (e.g., topic context, event context, etc.) and/or generate other context information (e.g., topic context, event context, etc.) based on time (e.g., temporal data). In an aspect, the time component 302 can determine temporal information associated with a topic or an event based on data (e.g., topic data, event data, etc.) received by recommendation component 102. For example, the time component 302 can determine an interval of time (e.g., as start time and/or an end time) associated with a topic or an event. In a non-limiting example, the time component can determine a start time and an end time for an event such as, but not limited to, a news event, an organized event, an entertainment event (e.g. a sporting event, a music event, a movie event, etc.), a social event, a travel event, etc.

The location component 304 can determine user context and/or generate user context information based on location (e.g., location data). In an aspect, the location component 304 can determine a location of a computing device associated with the user. In another aspect, the location component 304 can determine a geographic location of a user (e.g., based on a user profile and/or a computing device associated with the user). For example, the location component 304 can determine a country associated with a user, a region associated with a user, a state associated with a user, a city associated with a user, etc. Additionally or alternatively, the location component 304 can determine other context information (e.g., topic context, event context, etc.) and/or generate other context information (e.g., topic context, event context, etc.) based on location (e.g., location data). For example, the location component 304 can determine a country associated with a topic or an event, a region associated with a topic or an event, a state associated with a topic or an event, a city associated with a topic or an event, etc.

As such, the message component 204 can utilize data associated with the time component 302 and/or the location component 304 to generate, configure and/or send one or more notification messages. For example, the message component 204 can determine whether to send one or more messages to a user device based at least in part on data associated with the time component 302 and/or the location component 304. Additionally or alternatively, the message component 204 can determine what type of message to send to a user device based at least in part on data associated with the time component 302 and/or the location component 304.

Figure 4:
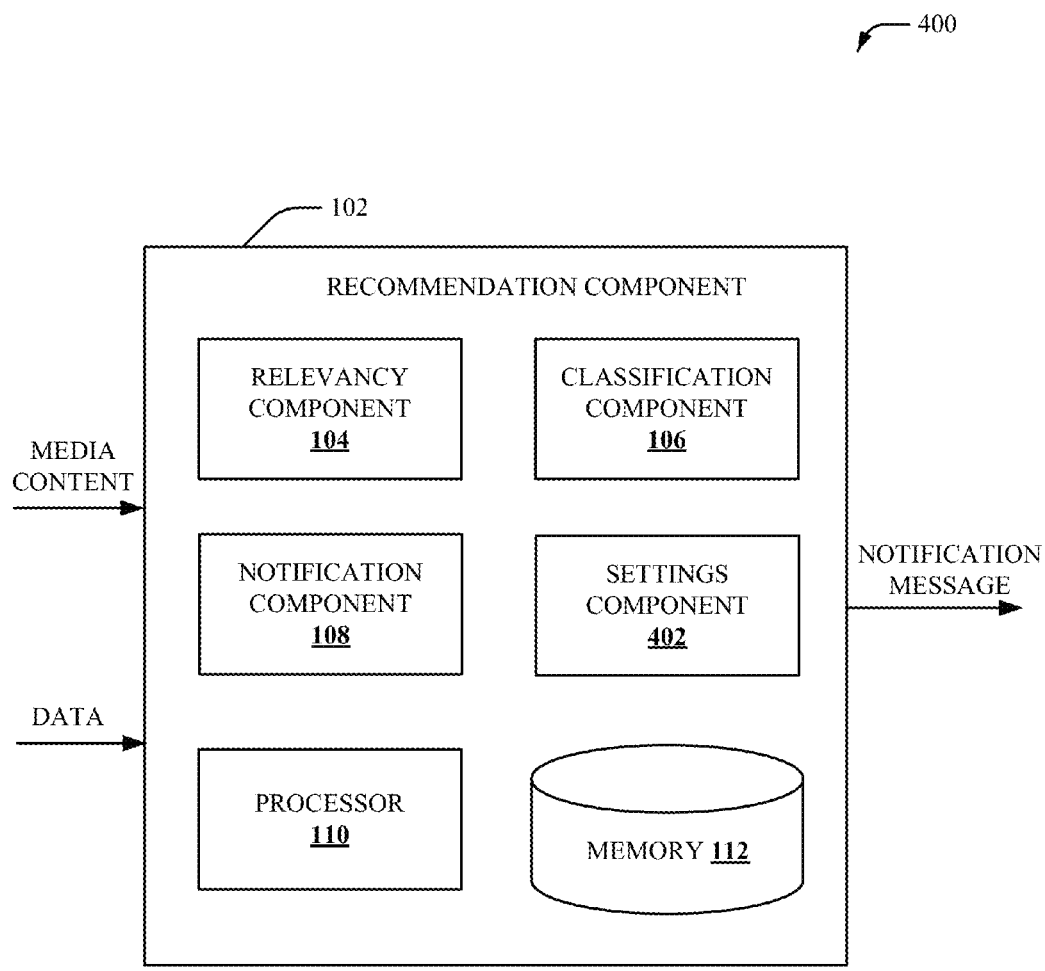
FIG. 4 illustrates a high-level block diagram of yet another example system for identifying and/or recommending relevant media content, in accordance with various aspects and implementations described herein.

FIG. 4 illustrates a non-limiting implementation of a system 400 in accordance with various aspects and implementations of this disclosure. The system 400 includes recommendation component 102. The recommendation component 102 can include the relevancy component 104, the classification component 106, the notification component 108 and/or a settings component 402. The notification component 108 can include the user context component 202 and/or the message component 204. The user context component 202 can include and/or be associated with the time component 302 and/or the location component 304.

The settings component 402 can be implemented to facilitate identifying and/or recommending relevant media content for users. In an aspect, settings component 402 can be associated with a graphical user interface. For example, a user can specify settings for identifying relevant media and/or receiving notification messages associated with relevant media content via the settings component 402.

In an aspect, the settings component 402 can be implemented to determine and/or configure one or more degrees of relevancy of media content. For example, the settings component 402 can modify (e.g., increase or decrease) a threshold value associated with a classifier value based on user input. In another aspect, the settings component 402 can modify (e.g., increase or decrease) a threshold value associated with a location (e.g., a geographic location) based on user input. However, it is to be appreciated that the settings component 402 can modify other criteria associated with the relevancy component 104, the classification component 106 and/or the notification component 108 based on user input. As such, an amount of uninteresting media content sent to users can be reduced.

Figure 5:
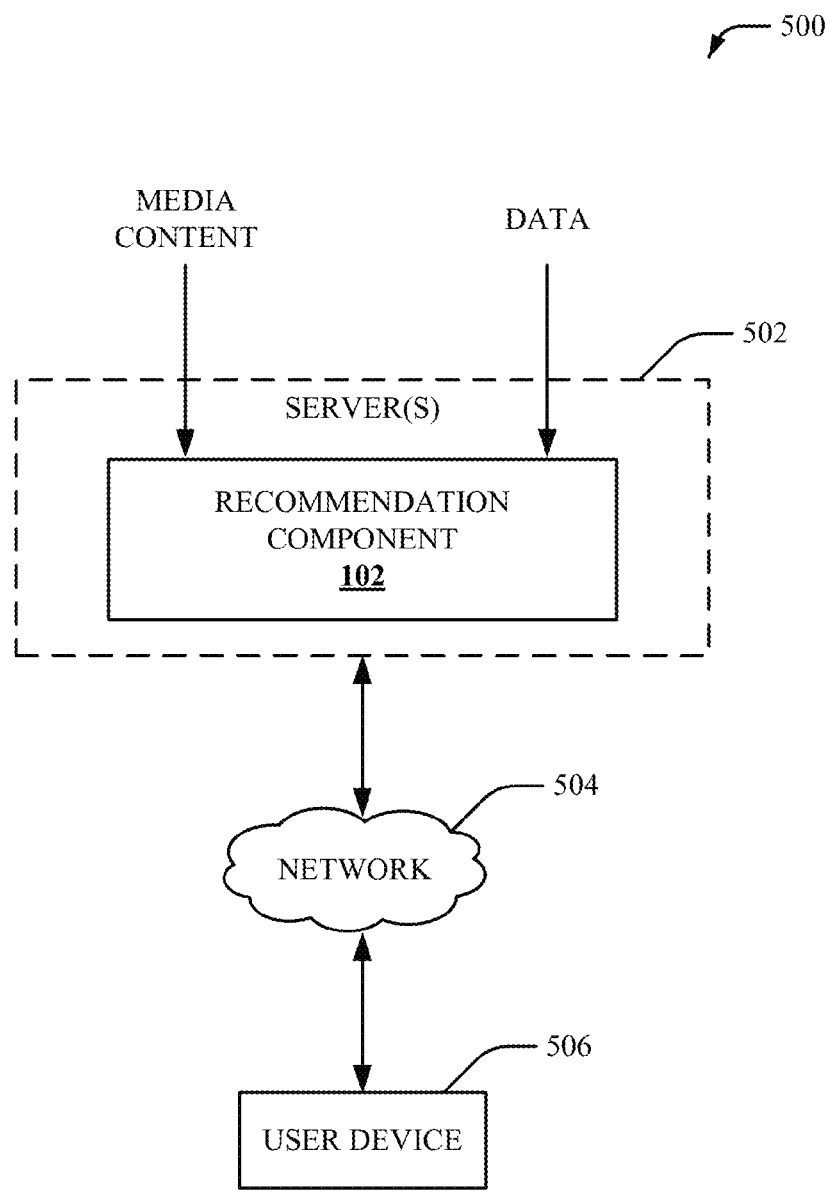
FIG. 5 illustrates an example system for identifying relevant media content and/or recommending relevant media content to a user device, in accordance with various aspects and implementations described herein.

FIG. 5 illustrates a non-limiting implementation of a system 500 in accordance with various aspects and implementations of this disclosure. The system 500 includes server(s) 502, network 504 and user device 506. Server(s) 502 can include and/or be associated with recommendation component 102. In an aspect, server(s) 502 can be associated with a media sharing service.

Recommendation component 102 can identify and/or recommend relevant media content, as more fully disclosed herein. For example, recommendation component 102 can identify relevant media content and/or recommend relevant media content to user device 506. In an aspect, recommendation component 102 can generate one or more notification messages associated with relevant media content. The one or more notification messages can be sent to the user device 506 via the network 504. The network 504 can include one or more networks. For example, network 504 can include one or more wired networks and/or one or more wireless networks, including but not limited to, a cellular network, a wide area network (WAN, e.g., the Internet), a local area network (LAN) and/or a personal area network (PAN). As such, a user (e.g., individual, member, account holder, etc.) associated with user device 506 can receive one or more notification messages, generate and/or consume media content, and/or generate data for the recommendation component 102 in the instance where the user (e.g., the individual, the member, the account holder, etc.) consents to the use of such data via virtually any desired wired or wireless technology, including, for example, cellular, WAN, wireless fidelity (Wi-Fi), Wi-Max, WLAN, etc.

User device 506 (e.g., user computing device 506) can include, but is not limited to, a mobile phone (e.g., a smartphone), a tablet, a personal computer (PC), a desktop computer, a laptop computer, a personal digital assistant (PDA), an electronic reader (e-reader), a camera, a media capable device, a portable computing device, an interactive television, an internet-connected television, a set-top box, a streaming media device, a gaming device, another computing device, etc. In an aspect, user device 506 can be associated with a user (e.g., an individual, a member, an account holder, etc.) of a media sharing service and/or a social networking service. Data associated with the user and/or the user device 506 can be implemented by recommendation component 102 in the instance where the user (e.g., the user associated with user device 506) consents to the use of such data for identifying relevant media content, recommending relevant media content and/or determining user context. In a non-limiting example, data associated with the user and/or the user device 506 can include, but is not limited to, temporal data associated with the user, data associated with a content consumed by the user, data associated with a user account, data associated with a media sharing service and/or a social networking service, data associated with an email account, data associated with a calendar (e.g., an electronic calendar, an online calendar, etc.), location data associated with the user device 506, geographic data associated with the user, and/or other data associated with the user and/or the user device 506. As such, the recommendation component 102 can facilitate recommending relevant media (e.g., real-time, new and/or diverse media content) to the user device 506.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 6-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 6:
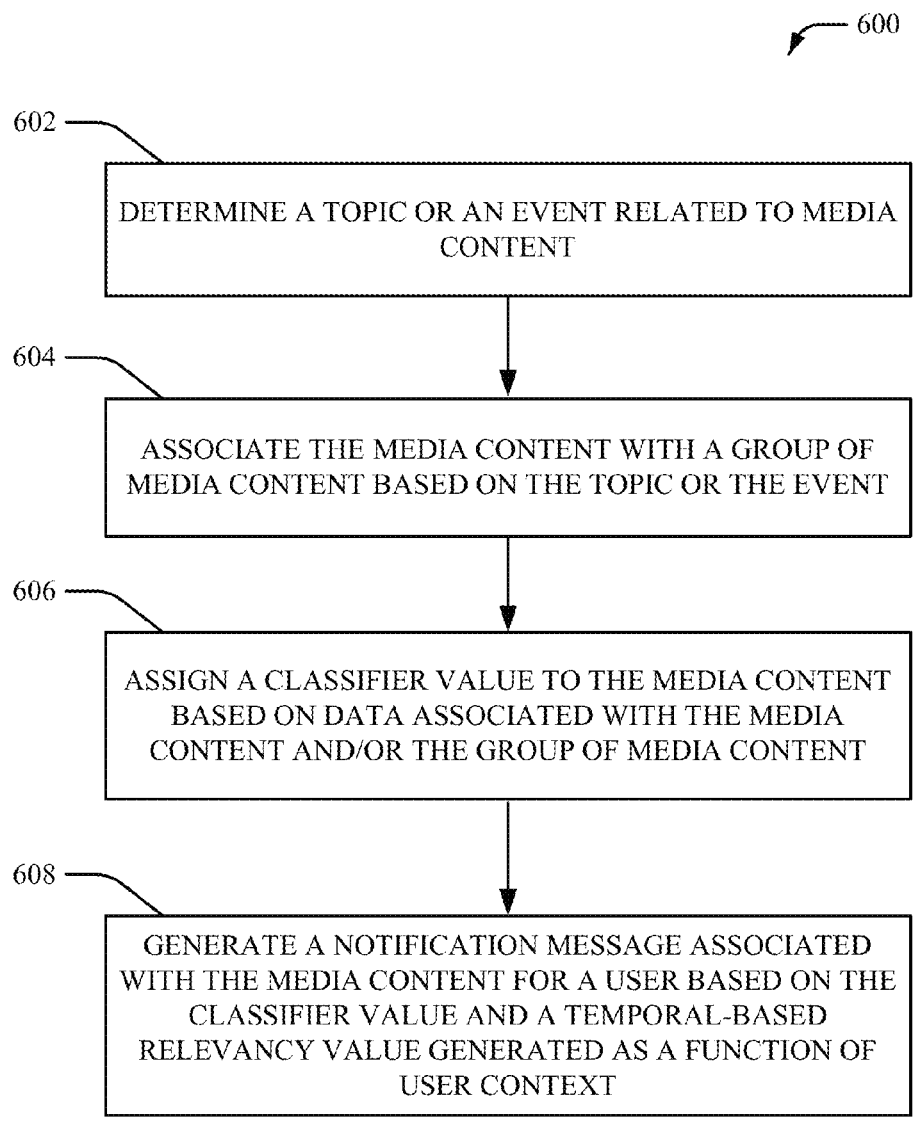
FIG. 6 depicts a flow diagram of an example method for identifying and/or recommending relevant media content, in accordance with various aspects and implementations described herein.

Referring to FIG. 6, there illustrated is a methodology 600 for identifying and/or recommending relevant media content, according to an aspect of the subject innovation. As an example, methodology 600 can be utilized in or in connection with various applications, such as, but not limited to, media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, etc. In another example, methodology 600 can be utilized in connection with various devices, such as, but not limited to, a mobile phone (e.g., a smartphone), a tablet, a personal computer (PC), a desktop computer, a laptop computer, a television (e.g., an interactive television, an internet-connected television, etc.), a personal digital assistant (PDA), an electronic reader (e-reader), a camera, a portable computing device, a set-top box, a streaming media device, a gaming device, another media capable device, etc.

At 602, a topic or an event related to media content is determined (e.g., by a relevancy component 104). A topic and/or an event can be a word or a set of words (e.g., phrase) that describes content included in and/or associated with the media content. As such, a topic and/or an event can be a category that classifies the media content. In an aspect, a topic can be non-temporal subject matter associated with and/or included in the media content. In another aspect, an event can be temporal-based subject matter associated with and/or included in the media content. Media content (e.g., a media file) can include but is not limited to a video (e.g., a video file, a video clip, a video sample, etc.), an image (e.g., an image file, a picture, a thumbnail, etc.), music (e.g., an audio file, an audio clip, an audio sample, etc.), an electronic book (e-book), a video game and/or user-generated content.

At 604, the media content is associated with a group of media content (e.g., by a relevancy component 104) based on the topic or the event. For example, the media content can be associated with a group of media content that is associated with the topic or the event (e.g., a group of media content that is determined to be related to the media content).

At 606, a classifier value is assigned to the media content (e.g., by a classification component 106) based on data associated with the media content and/or the group of media content. For example, a type of classifier value can be determined as a function of textual data and/or video data associated with the media content and/or the group of media content. In one example, a type of classifier value can be determined as a function of a determined quality and/or a determined relevancy of the media content. In an aspect, a first classifier value can be assigned to the media content based on a first threshold value related to the data associated with the media content and/or the group of media content, a second classifier value can be assigned to the media content based on a second threshold value related to the data associated with the media content and/or the group of media content, etc.

At 608, a notification message associated with the media content is generated (e.g., by a notification component 108) for a user based on the classifier value and a temporal-based relevancy value generated as a function of user context. For example, the temporal-based relevancy value can be associated with a certain time interval. In an aspect, user context can be determined based on data associated with the user (e.g., time-based data and/or location-based data associated with the user) in the instance where the user consents to the use of such data for identifying relevant media content, recommending relevant media content and/or determining user context. In another aspect, the temporal-based relevancy value can be additionally or alternatively generated as a function of context associated with the topic or the event.

Figure 7:
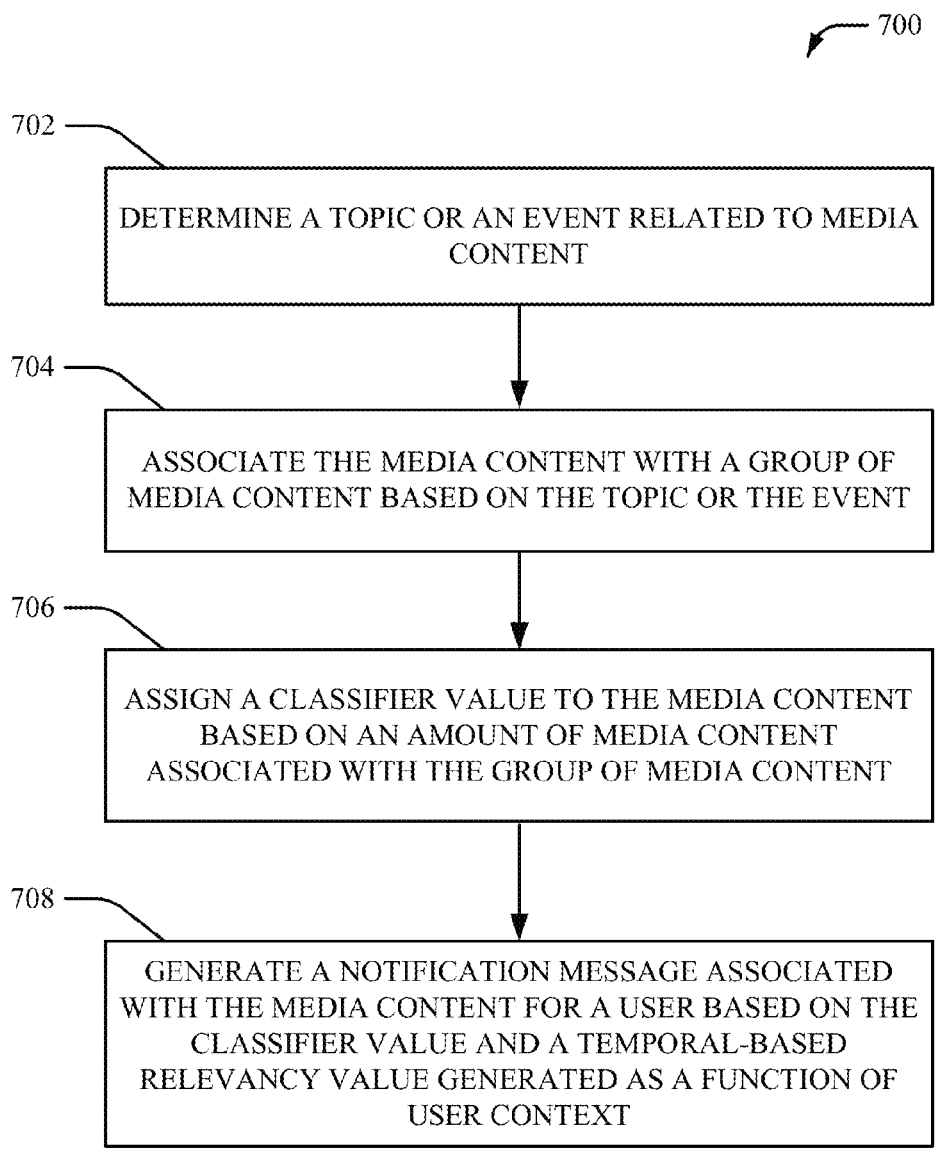
FIG. 7 depicts a flow diagram of an another example method for identifying and/or recommending relevant media content, in accordance with various aspects and implementations described herein.

Referring to FIG. 7, there illustrated is an example methodology 700 for identifying and/or recommending relevant media content, according to another aspect of the subject innovation. At 702, a topic or an event related to media content is determined (e.g., by a relevancy component 104). At 704, the media content is associated with a group of media content (e.g., by a relevancy component 104) based on the topic or the event. At 706, a classifier value is assigned to the media content (e.g., by a classification component 106) based on an amount of media content associated with the group of media content. For example, a type of classifier value can be determined as a function of a total number of media content associated with the group of media content. In an aspect, a first classifier value can be assigned to the media content based on a first threshold value associated with total number of media content included in the group of media content, a second classifier value can be assigned to the media content based on a second threshold value associated with total number of media content included in the group of media content, etc. At 708, a notification message associated with the media content is generated (e.g., by a notification component 108) for a user based on the classifier value and a temporal-based relevancy value generated as a function of user context.

Figure 8:
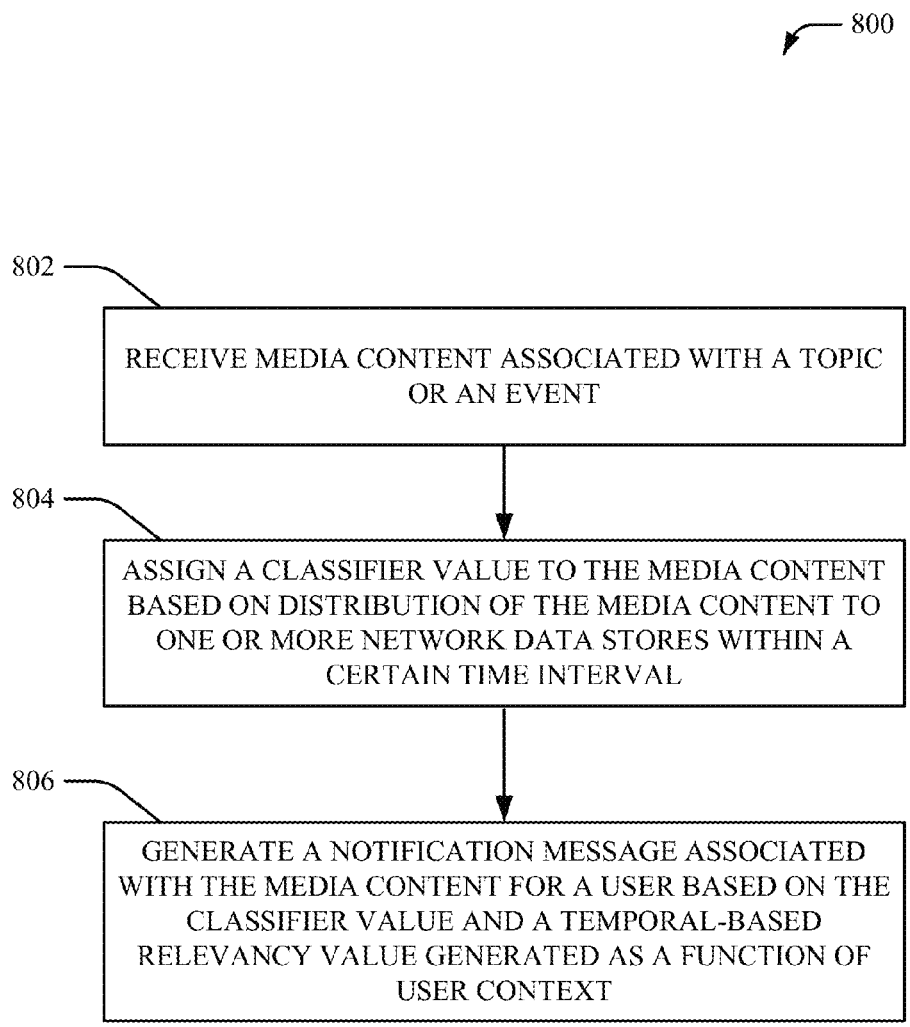
FIG. 8 depicts a flow diagram of yet another example method for identifying and/or recommending relevant media content, in accordance with various aspects and implementations described herein.

Referring to FIG. 8, there illustrated is an example methodology 800 for identifying and/or recommending relevant media content, according to yet another aspect of the subject innovation. At 802, media content associated with a topic or an event is received (e.g., by a classification component 106). At 804, a classifier value is assigned to the media content (e.g., by a classification component 106) based on distribution of the media content to one or more network data stores within a certain time interval. For example, a classifier value can be assigned to the media content based on rate of sharing of the media content (e.g., rate of sharing of the media content via a network). At 806, a notification message associated with the media content is generated (e.g., by a notification component 108) for a user based on the classifier value and a temporal-based relevancy value generated as a function of user context.

Figure 9:
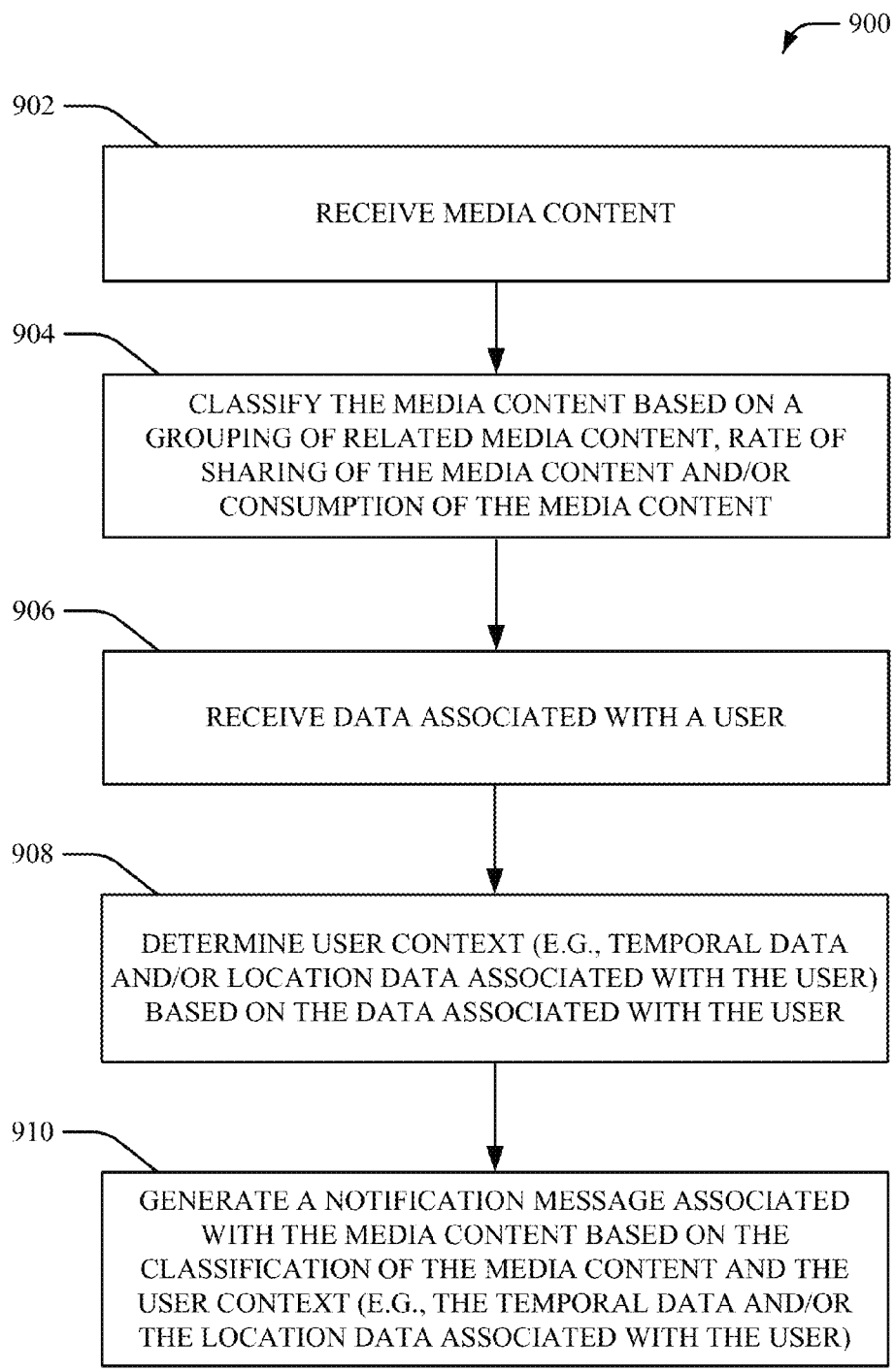
FIG. 9 depicts a flow diagram of yet another example method for identifying and/or recommending relevant media content, in accordance with various aspects and implementations described herein.

Referring to FIG. 9, there illustrated is an example methodology 900 for identifying and/or recommending relevant media content, according to yet another aspect of the subject innovation. At 902, media content is received (e.g., by relevancy component 104). At 904, the media content is classified (e.g., by a classification component 106) based on a grouping of related media content, rate of sharing of the media content and/or consumption of the media content. For example, the media content can be classified based on an amount of other media content related to the media content, sharing rate of the media content and/or total number of views associated with the media content. At 906, data associated with a user is received (e.g., by a user context component 202). For example, the data associated with the user can be received in the instance where a user consents to the use of such data for identifying relevant media content, recommending relevant media content and/or determining user context. At 908, user context (e.g., temporal data and/or location data associated with the user) is determined (e.g., by a user context component 202) based on the data associated with the user. At 910, a notification message associated with the media content is generated (e.g., by a message component 204) based on the classification of the media content and the user context (e.g., the temporal data and/or the location data associated with the user). For example, a type of notification message associated can be generated based on the classification of the media content and the user context (e.g., the temporal data and/or the location data associated with the user). In an aspect, a notification message can be a notification (e.g., a push notification) for a user device. In another aspect, a notification message can be an email notification. In another aspect, a notification message can be an operating system notification associated with a user device. In yet another aspect, a notification message can be presented via a webpage or an application associated with a media sharing service.

Figure 10:
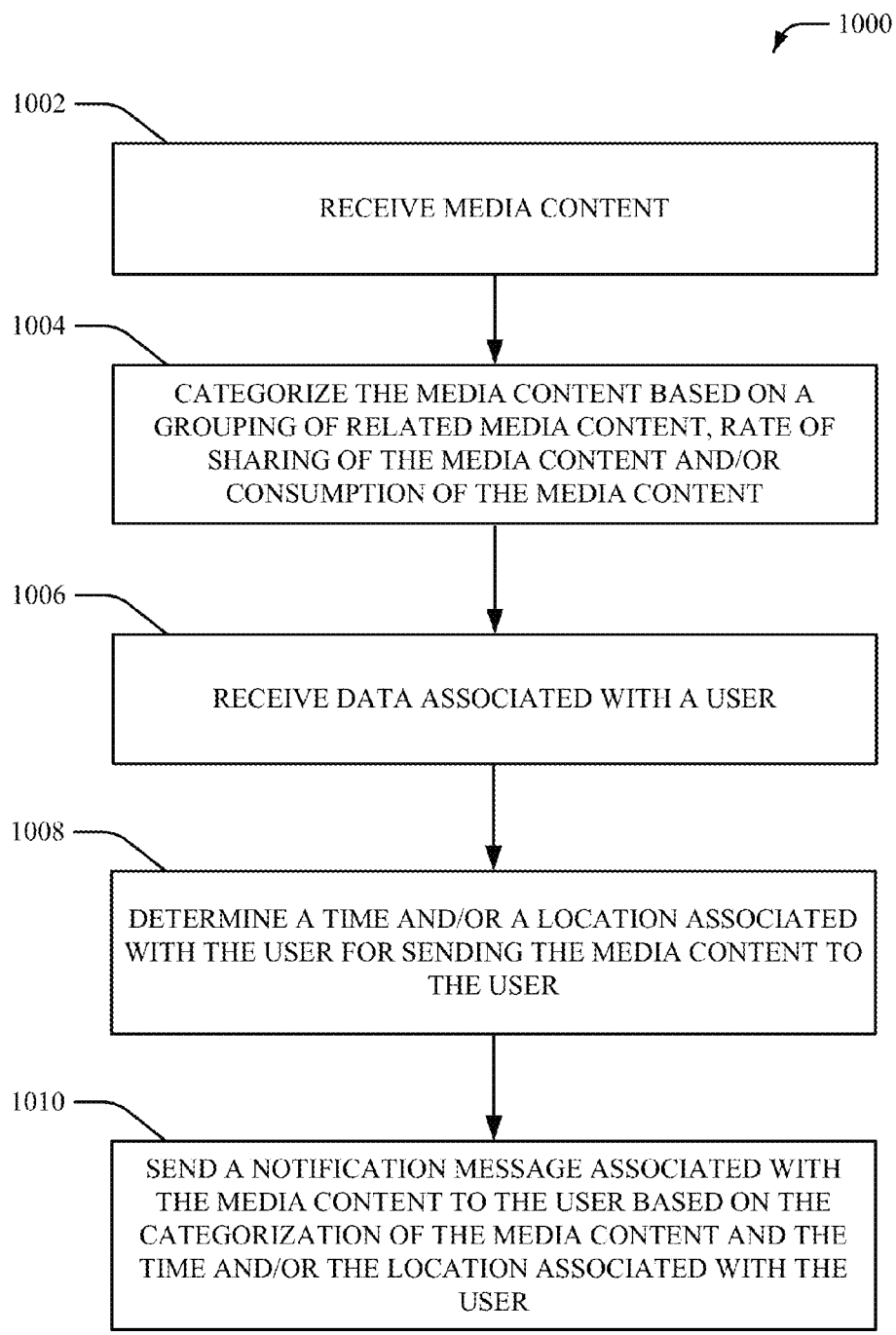
FIG. 10 depicts a flow diagram of yet another example method for identifying and/or recommending relevant media content, in accordance with various aspects and implementations described herein.

Referring to FIG. 10, there illustrated is an example methodology 1000 for identifying and/or recommending relevant media content, according to yet another aspect of the subject innovation. At 1002, media content is received (e.g., by relevancy component 104). At 1004, the media content is categorized (e.g., by a classification component 106) based on a grouping of related media content, rate of sharing of the media content and/or consumption of the media content. At 1006, data associated with a user is received (e.g., by a user context component 202). For example, the data associated with the user can be received in the instance where a user consents to the use of such data for identifying relevant media content, recommending relevant media content and/or determining user context. At 1008, a time and/or a location associated with the user is determined (e.g., by a time component 302 and/or a location component 304) for sending the media content to the user. For example, user context of the user can be determined based on data associated with the user. In an aspect, user context can be determined based on temporal data and/or location data associated with the user. In another aspect, user context can be determined based on content consumed by the user. In yet another aspect, user context can be determined based on data associated with an account of the user. In yet another aspect, other context can be determined based on temporal data and/or location data associated with the media content (e.g., a topic or an event associated with the media content). At 1010, a notification message associated with the media content is sent (e.g., by a message component 204) to the user based on the categorization of the media content and the time and/or location associated with the user.

Figure 11:
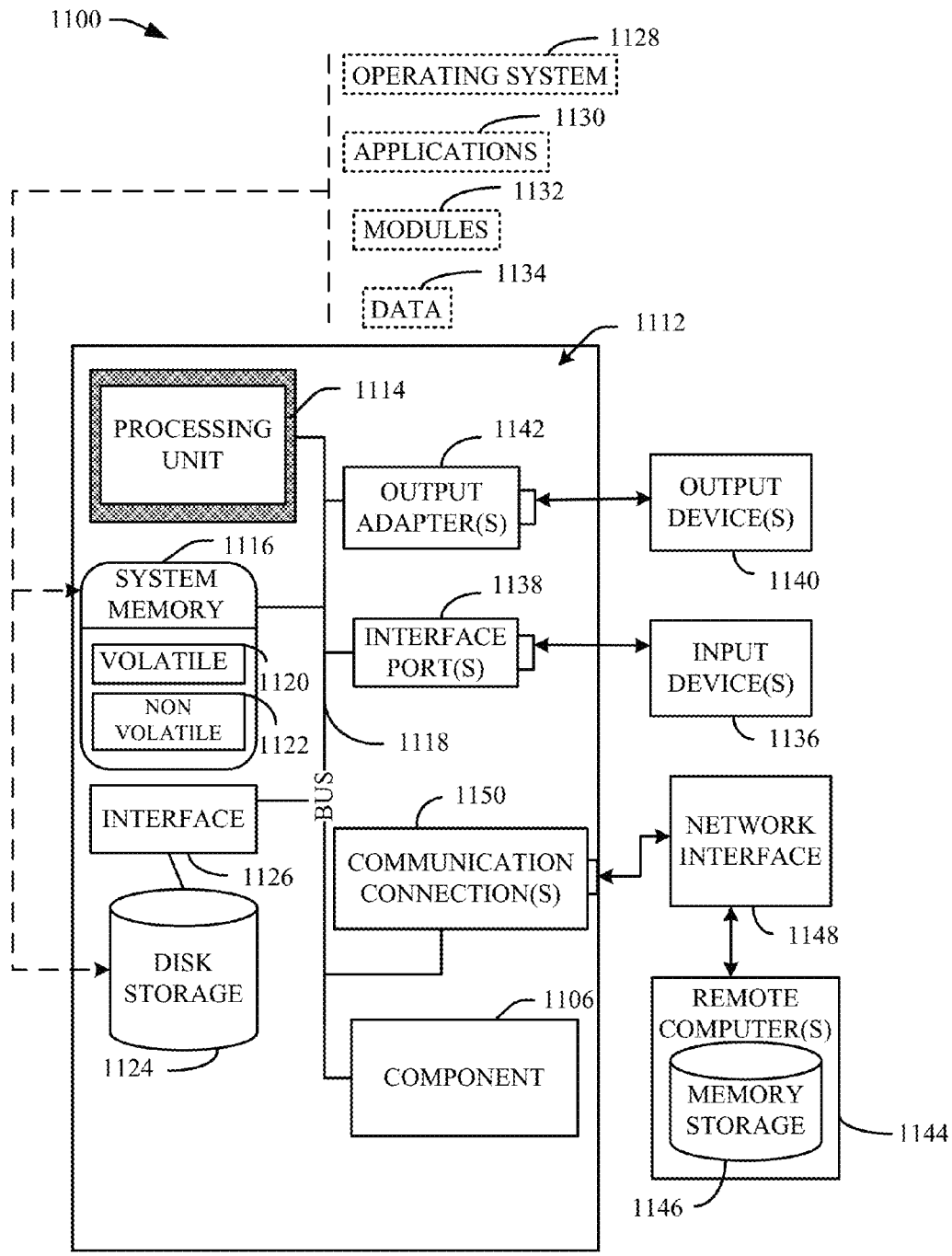
FIG. 11 is a schematic block diagram illustrating a suitable operating environment.
Figure 12:
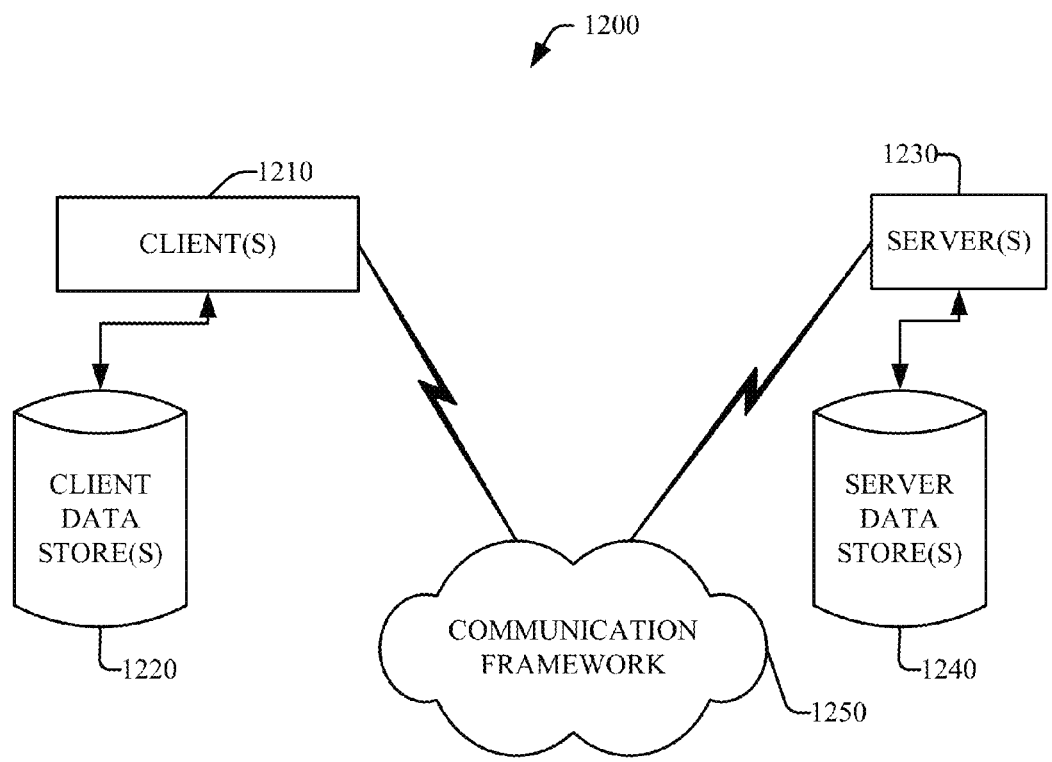
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

It is to be appreciated that the computer 1112 can be used in connection with implementing one or more of the systems or components shown and described in connection with FIGS. 1-5. In accordance with various aspects and implementations, the computer 1112 can be used to identify and/or recommend relevant media content. In certain exemplary embodiments, the computer 1112 includes a component 1106 (e.g., recommendation component 102) that can contain, for example, a relevancy component, a classification component, a notification component, a user context component, a message component, a time component, a location component and/or a settings component, each of which can respectively function as more fully disclosed herein.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., recommendation component, relevancy component, classification component, notification component, user context component, message component, time component, location component, settings component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory storing computer executable instructions; and
   a processor configured to execute the computer executable instructions stored in the memory to implement operations comprising:
      determining that a media content item is related to an event;
      associating the media content item with a group of media content items associated with the event;
      determining a geographic region associated with the event;
      determining a period of time associated with the event;
      determining a number of media content items in the group of media content items;
      determining a first threshold number of media content items based on the geographic region associated with the event;
      in response to determining that the number of media content items in the group of media content items is above the first threshold number, assigning a first classifier value to the media content item, wherein the first classifier value is associated with a first interest level classification;
      determining that a first user is associated with the geographic region associated with the event; and
      in response to determining that the first user is associated with the geographic region associated with the event, generating a first notification message associated with the media content item for the first user based on the first classifier value and the period of time relative to a current time.

2. The system of claim 1, wherein the processor is further configured to:
   determine a second threshold number of media content items, wherein the second threshold number is greater than the first threshold number;
   in response to determining that the number of media content items is above the second threshold number, assign a second classifier value to the media content item, wherein the second classifier value is associated with a second interest level classification;
   determine that a second user is not associated with the geographic region associated with the event; and
   in response to determining that the second user is not associated with the geographic region associated with the event, generate a second notification message associated with the media content item for the second user based on the second classifier value and the period of time relative to the current time.

3. The system of claim 1, wherein determining that the first user is associated with the geographic region associated with the event is based on media content consumed by the first user.

4. The system of claim 1, wherein determining that the first user is associated with the geographic region associated with the event is based on data associated with an account of the first user.

5. The system of claim 1, wherein assigning the first classifier value to the media content item is further based on a distribution of the media content item to one or more network data stores within a certain time interval.

6. The system of claim 1, wherein assigning the first classifier value to the media content item is further based on a rate of consumption of the media content item.

7. The system of claim 1, wherein the first notification message is a notification for a user device.

8. The system of claim 1, wherein the first notification message is an email notification.

9. The system of claim 1, wherein the first notification message associated with the media content item is based on a user profile of the first user.

10. A method, comprising:
    employing a processor that facilitates execution of computer executable instructions stored on a non-transitory computer readable medium to implement operations, comprising:
       determining that a media content item is related to an event;
       associating the media content item with a group of media content items associated with the event;
       determining a geographic region associated with the event;
       determining a period of time associated with the event;
       determining a number of media content items in the group of media content items;
       determining a first threshold number of media content items based on the geographic region associated with the event;
       in response to determining that the number of media content items in the group of media content items is above the first threshold number, assigning a first classifier value to the media content item, wherein the first classifier value is associated with a first interest level classification;

determining that a first user is associated with the geographic region associated with the event; and in response to determining that the first user is associated with the geographic region associated with the event, generating a first notification message associated with the media content item for the first user based on the first classifier value and the period of time relative to a current time.

11. The method of claim 10, further comprising:

determining a second threshold number of media content items, wherein the second threshold number is greater than the first threshold number;

in response to determining that the number of media content items is above the second threshold number, assigning a second classifier value to the media content item, wherein the second classifier value is associated with a second interest level classification;

determining that a second user is not associated with the geographic region associated with the event; and in response to determining that the second user is not associated with the geographic region associated with the event, generating a second notification message associated with the media content item for the second user based on the second classifier value and the period of time relative to the current time.

12. The method of claim 10, wherein determining that the first user is associated with the geographic region associated with the event is based on media content consumed by the first user.

13. The method of claim 10, wherein determining that the first user is associated with the geographic region associated with the event is based on data associated with an account of the first user.

14. The method of claim 10, wherein assigning the first classifier value to the media content item is further based on a sharing rate of the media content item.

15. The method of claim 10, wherein assigning the first classifier value to the media content item is further based on a consumption of the media content item.

16. A non-transitory computer readable storage medium comprising computer-executable instructions, that in response to execution, cause a computing system to perform operations, comprising:

determining that a media content item is related to an event;

associating the media content item with a group of media content items associated with the event;

determining a geographic region associated with the event;

determining a period of time associated with the event;

determining a number of media content items in the group of media content items;

determining a first threshold number of media content items based on the geographic region associated with the event;

in response to determining that the number of media content items in the group of media content items is above the first threshold number, assigning a first classifier value to the media content item, wherein the first classifier value is associated with a first interest level classification;

determining that a first user is associated with the geographic region associated with the event; and in response to determining that the first user is associated with the geographic region associated with the event, generating a first notification message associated with the media content item for the first user based on the first classifier value and the period of time relative to a current time.

* * * * *